United States Patent [19]

Bennett

[11] Patent Number: 4,993,738
[45] Date of Patent: Feb. 19, 1991

[54] ANTIJACKKNIFE DEVICE FOR TOWED TRAILER

[76] Inventor: Henry E. Bennett, 710 Oak Ave., Davis, Calif. 95616

[21] Appl. No.: 473,002

[22] Filed: Jan. 31, 1990

[51] Int. Cl.⁵ .............................................. B60D 1/30
[52] U.S. Cl. ................................... 280/432; 280/442; 280/446.1; 280/474
[58] Field of Search ...................... 280/423.1, 426, 432, 280/442, 446.1, 457, 458, 474, DIG. 14

[56] References Cited

U.S. PATENT DOCUMENTS

| | | | |
|---|---|---|---|
| 3,305,246 | 10/1964 | Gonczy | 280/432 X |
| 3,379,456 | 4/1968 | Bogie | 280/432 |
| 3,722,919 | 3/1973 | Herbert | 280/432 |
| 3,874,699 | 4/1975 | Hayes et al. | 280/432 |
| 4,068,860 | 1/1978 | Meyers et al. | 280/432 |
| 4,109,929 | 8/1978 | Koroknay et al. | 280/432 |
| 4,252,336 | 2/1981 | Hubbard | 280/432 |
| 4,405,147 | 9/1983 | Horseman | 280/442 X |
| 4,438,943 | 3/1984 | Hebert | 280/432 |

Primary Examiner—Charles A. Marmor
Assistant Examiner—Victor E. Johnson
Attorney, Agent, or Firm—Townsend and Townsend

[57] ABSTRACT

In the combination of a power truck tractor towing serially first and second (or more) trailers, an antijackknifing hitch is disclosed for preventing jackknifing relative movement between the two towed trailers. The tractor towed first trailer is conventionally connected to the towed second trailer at a pivoting tongue. The pivoting tongue from the second trailer forms the towing point of connection to the first trailer and effects steering of the forward tandem set of wheels on the second towed trailer. Running rigging is provided with fixed ends spaced from the towing point of connection at the trailing sides of the towing trailer. The rigging runs between the fixed points by passing from one fixed point on the towing trailer to the leading edge of the towed trailer. Thereafter, the rigging runs to the towing tongue and then to the opposite leading edge of the towed trailer. Finally the rigging runs to the second fixed point on the back of the towing trailer. At least two brakes on the running rigging are required; one brake is on the leading edge of the towed trailer. The other brake is on the trailer tongue of the towed trailer.

9 Claims, 2 Drawing Sheets

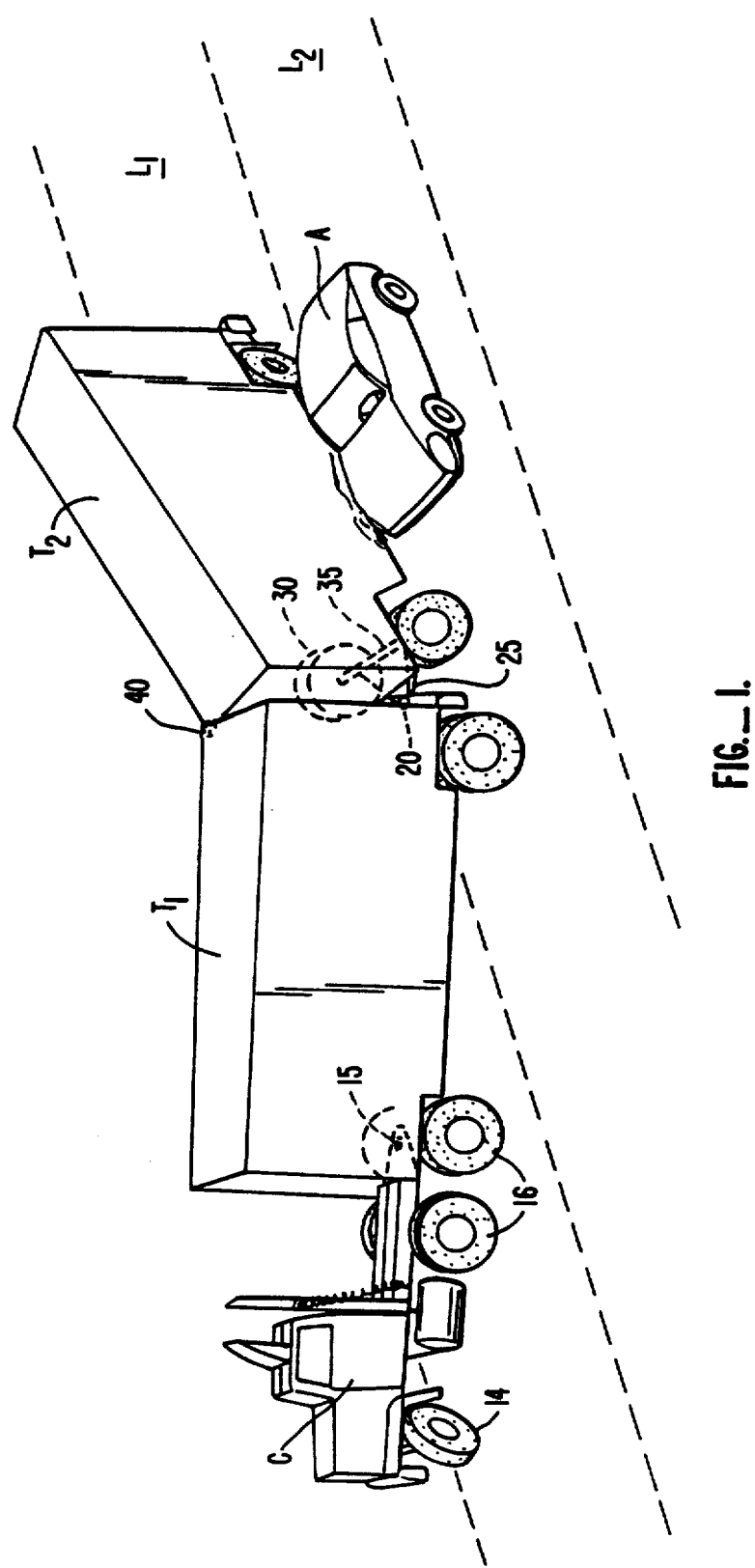
FIG._1.

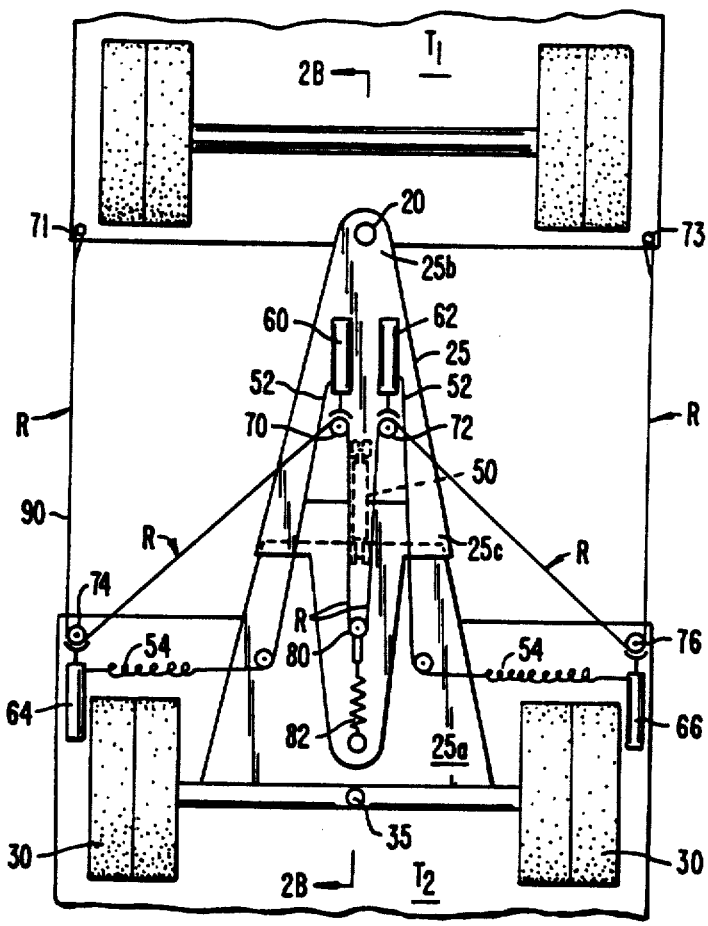
FIG._2A.
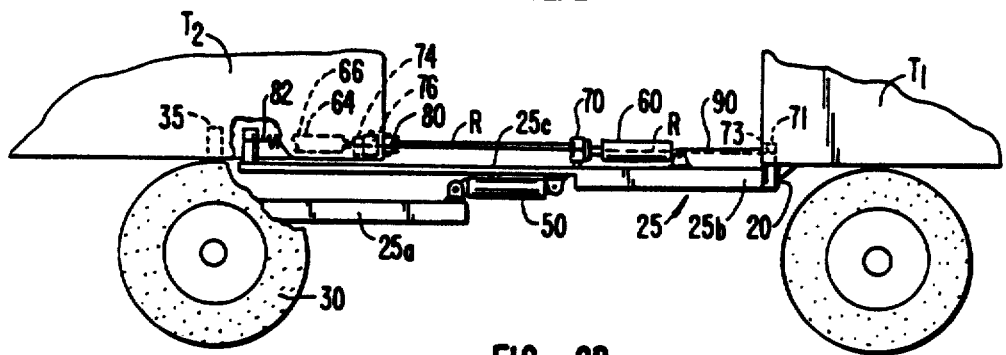
FIG._2B.
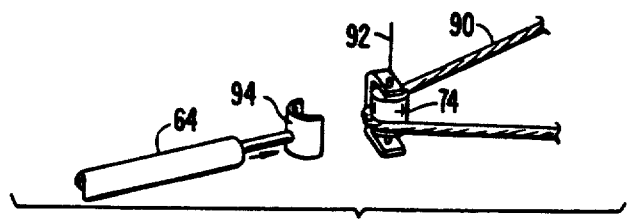
FIG._3.

4,993,738

ANTIJACKKNIFE DEVICE FOR TOWED TRAILER

BACKGROUND OF THE INVENTION

1. Field of the Invention

This invention relates to antijackknifing devices attached to a trailer. More particular, an antijackknifing device is disclosed which acts between first and second serially towed trailers. The device herein disclosed is to be distinguished from those antijackknifing devices which act between a towing tractor on one hand and the first towed trailer on the other hand.

The term "jackknifing" refers to a common accident occurring between a towing vehicle and a towed vehicle. Specifically, when the towing vehicle comes to an abrupt halt, the towed vehicle frequently overtakes the towing vehicle. In such overtaking action, the towed vehicle typically changes its relative angular alignment with respect to the towing vehicle. For example, a truck trailer which normally occupies one lane suddenly becomes angularly askew with respect to the roadway and occupies several lanes with great suddenness. Collisions with adjacent and following vehicles occur. Frequently upsetting of the truck and trailer results. Serious injury can follow.

2. Brief Description of the Prior Art

Antijackknifing devices between a towing powered tractor and the first following and towed tailer are quite well known. Examples of such devices may be found in Herbert U.S. Pat. No. 3,722,919, Hubbert U.S. Pat. No. 4,252,336, Hayes et al. U.S. Pat. No. 3,874,699, Myers U.S. Pat. No. 4,068,860, Koroknay et al. U.S. Pat. No. 4,109,929 and Herbert U.S. Pat. No. 4,438,943.

It has become increasingly common, particularly in the Western United States, for tractors to tow more than one trailer. When more than one trailer is towed, there are multiple points of interconnection where jackknifing can occur. These multiple points are located at articulating interfaces other that the interface between the powered towing tractor and the first trailer. Accordingly, there exists a need for antijackknifing devices at articulating interfaces other than those between the tractor and the first towed trailer.

In order to make clear the following description, terminology must be defined. In this specification I will refer to the "towing trailer" as that trailer which is nearest the powered tractor. I will refer to the towed trailer as that trailer which is serially pulled by the towing trailer.

SUMMARY OF THE INVENTION

In the combination of a power truck tractor towing serially first and second (or more) trailers, an antijackknifing hitch is disclosed for preventing jackknifing relative movement between the two towed trailers. The tractor towed first trailer is conventionally connected to the towed second trailer at a pivoting tongue. The pivoting tongue from the second trailer forms the towing point of connection to the first trailer and effects steering of the forward tandem set of wheels on the second towed trailer. Running rigging is provided with fixed ends spaced from the towing point of connection at the trailing sides of the towing trailer. The rigging runs between the fixed points by passing from one fixed point on the towing trailer to the leading edge of the towed trailer. Thereafter, the rigging runs to the towing tongue and then to the opposite leading edge of the towed trailer. Finally the rigging runs to the second fixed point on the back of the towing trailer. At least two brakes on the running rigging are required; one brake is on the leading edge of the towed trailer. The other brake is on the trailer tongue of the towed trailer. The brakes—preferably of the hydraulic variety—are actuated by the momentum of the towed trailer acting on the towing trailer to compress a brake cylinder and lock the brakes on the running rigging during braking between the two trailers. With the brakes locked on the running rigging, the tongue of the towed trailer is held in a fixed position relative to the towed trailer. At the same time the tongue is locked, the towed trailer is restrained by the rigging acting across the towing and towed trailer from effecting angular movement with respect to the towing trailer. Thus, upon braking towed and towing trailers become locked in relative angular movement one with respect to another inhibiting conventional jackknifing.

FURTHER OBJECTS, FEATURES AND ADVANTAGES

An object of this invention is to disclose an antijackknifing system which has its major operative portions attached to the leading portion of the towed trailer. Accordingly, an antijackknifing system is set forth in which running rigging and brakes are all mounted to the towed trailer. All that is required of the towing trailer is a conventional point of attachment for the tongue of the towed trailer and two spaced apart fixed points for securing the running rigging at the towing trailer.

An advantage of the disclosed apparatus is that the connection of the towed trailer to the towing trailer is not unnecessarily complicated. In addition to conventional attachment of the towing tongue, all that is required is that the two ends of the running rigging be serially attached to the towing trailer at the receptive fixed points.

DETAILED DESCRIPTION OF THE DRAWINGS

Other objects and advantages of this invention will become more apparent after referring to the following specification and attached drawings in which:

FIGS. 1 illustrates a segment of a multiple lane roadway illustrating a truck towing tandemly connected serial trailers with a passenger car along side and to the left of the second serially towed trailer, the figure showing a typical accident wherein the second or towed trailer has become angularly disposed to the first and towing trailer during rapid braking of the truck with the result that the trailer occupies more than one lane and comes into accidental contact with the adjacent passenger car vehicle;

FIG. 2A is a schematic of the running rigging of my invention illustrating the preferred embodiment in which discrete brakes act on the installed running rigging utilizing the momentum of the towed trailer acting through the towing tongue on the towing trailer to lock the rigging and prevent relative angular movement between the towed and towing trailer;

FIG. 2B is a side elevation section taken along lines 2B—2B of FIG. 2A illustrating the placement of a hydraulic cylinder for communicating hydraulic pressure to the four brakes illustrated in FIG. 2A; and, FIG. 3 is a detail of one of the brakes utilized in the disclosed reeving system.

Referring to FIG. 1, a conventional tractor C with tandem towed first trailer T: and the second towed trailer $T_2$ illustrated. Tractor C includes forward steering wheels 14 and driving wheels 16. Connection between the forward towed trailer $T_1$ and the tractor C is shown at a conventional fifth wheel 15 here schematically illustrated. It is to be noted that in the prior art, it is well known to place antijackknifing devices at the interface between the tractor C and the first towed trailer $T_1$. In fact for the remainder of this specification, it will be assumed that such an antijackknifing device is in place.

In accordance with my previously established convention, I will hereafter refer to trailer $T_1$ as the "towing" trailer. Second trailer $T_2$ will be referred to as the "towed trailer".

Towing trailer $T_1$ is typically provided with a hitch point 20. A tongue 25 conventionally fastens to hitch point 20. This tongue is attached to a steering wheel set 30 on the leading portion of the towed trailer $T_2$. Simply stated, as the tongue 25 turns in its hitched attachment between towing trailer $T_1$ and towed trailer $T_2$ so do wheel sets 30 attach to the tongue. Such turning occurs about a pivot point 35 on trailer $T_2$.

I illustrate a plan view with the towed truck trailer occupying lane $L_1$. A side-by-side lane $L_2$ is shown occupied by an automobile A. For graphic understanding of the problem herein solved, the beginning of a typical jackknifing accident is shown in FIG. 1.

In such an accident, all wheels of the entire truck-/tailer combination are braked. In such accidents, typically road surface is slick, as due to the presence of rain, ice or foreign materials in the interface between the wheels of the truck and trailers in the roadway. During braking, the considerable momentum of the towed trailer $T_2$ attempts to overtake the towing trailer $T_1$. The pivoting of the leading wheel set at 35 of the steering wheels 30 of the towed trailer $T_2$ occurs. At the same time further angularity is generated between the pivot point 20 to trailer $T_1$ at the leading edge of the tongue 25. A random and angular alignment of the towed trailer $T_2$ with respect to the towing trailer $T_1$ occurs. The two trailers and their tractor C which formerly occupied lane Ll now occupy both lanes $L_1$ and $L_2$. The adjacent automobile A is shown in the process of being impacted.

In such jackknifing action there will typically be damage to the bodies of the trailer as indicated by the point of overlap 40. More importantly, the trailers and tractor frequently capsize and block entire multiple lane roadways. Serious accidents occur.

Having set forth the problem area, attention will first be directed to FIG. 2A. In FIG. 2A the antijackknifing device of my invention will be set forth. Thereafter, with respect to FIG. 2B actuation of the hydraulic brakes on the running rigging will be set forth. With respect to FIG. 3, a typical brake on the running rigging will be set forth. Finally, and with respect to all of the figures, the operation of my disclosed apparatus will be set forth.

Referring to FIG. 2A, towing trailer $T_1$ is shown with a pivot point 20. It is at pivot point 20 that tongue of this invention attaches. As is conventional, tongue attaches to the forward steering wheel set 30 of the towed trailer $T_2$. Such attachment is conventionally illustrated.

Tongue 25 is shown modified. The modifications include two broad categories.

First, the tongue 25 includes a brake actuating cylinder 50. Brake actuating cylinder supplies hydraulic pressure to the antijackknifing invention of my apparatus.

Second, the tongue is provided with paired brakes 60, 62. Brakes 60, 62 act on the running rigging and effect braking of the running rigging. Additionally, the leading edge of towed trailer $T_2$ is equipped with two additional brakes 64, 66. See FIG. 2A. Brakes 64, 66 apply a braking force to running rigging R extending between towed trailer $T_2$ and towing trailer $T_1$.

Running rigging R may be easily understood. Running rigging typically constitutes a wire cable attached to a first fixed point 71 on the rear left side of towing trailer $T_1$. The running rigging passes around a sheave 74 opposite brake 64 and to a second sheave 70 on tongue 25. Likewise, running rigging R at its opposite end attaches to a fixed point 73 at the rear of towing trailer $T_1$. From fixed point 73 the running rigging passes around a sheave 76 on the leading end of towing trailer $T_2$. From sheave 76 it passes to a sheave 72 on tongue 25.

I prefer but it is not required to provide a running rigging tensioning pulley 80 between the sheaves 70, 72 on tongue 25. Specifically, running rigging R is tensioned at sheave 80 under a spring force 82. Spring force 82 can be applied as by conventional springs. Preferably, sheave tongue 25 is constructed so that tension at sheave 80 does not set any of the brakes through cylinder 50. This construction occurs by directly linking spring 82 to pivot point 20.

Running rigging R typically comprises a cable 90. Cable 90 is conventional. The action of the cable at a typical sheave in response to a brake on the cable is illustrated with respect to FIG. 3 in the perspective view of brake cylinder 64, sheave 74 and the illustrated cable.

Sheave 74 is typically cylindrical and spins about a vertical axis 92. Brake 64 includes a complementary cylinder sectioned brake shoe 94. The shoe 94 acts over the sheave 74 and the cable 90. When hydraulic pressure within cylinder 64 forces shoe 94 over sheave 74 braking action on the cable results.

I have shown here a particular format of brake on the sheave 74. The reader will understand that virtually any other form of running rigging and brake will as well suffice for this invention.

Having set forth the path of the running rigging and the disposition of the brakes, attention can now be directed to the application of the braking force by the cylinder 50. Such application is illustrated in FIG. 2B.

In FIG. 2B it can be seen that tongue 25 is divided into first and second parts 25a and 25b. These respective parts are given relative linear motion with respect to one another over a central sleeve portion 25c. That is to say the forward portion of tongue 25 at 25b is free to reciprocate a small distance with respect to the rear portion of tongue 25 at 25a.

At the same time, section 25c firmly links the relative portions 25a and 25b together so that a towing force can occur between trailers $T_1$ and $T_2$. These respective sections are therefore capable of towing towed trailer $T_2$ from towing trailer $T_1$.

Sleeve 25c and tongue portion 25b are rigidly linked together. Sleeve 25c support sheave 80 and spring 82. Consequently, a tensioning of cable 90 by spring 82 cannot cause setting of cylinder 50.

Intermediate of the two sections 25a, 25b there is placed the hydraulic brake actuating cylinder 50. Cylinder is connected by lines 52, 54 to apply hydraulic fluid pressure to the respective brakes 60, 62, 64, 66. As is well known in the art, other types of hydraulic brakes and hydraulic circuits may be used. For example, double chambered brake cylinders activating redundant brake cylinders can be substituted as a safety feature.

Operation of the braking mechanism can simply be understood. Specifically, when braking of the rig with a tendency to jackknife occurs, towed trailer $T_2$ attempts to overtake towing trailer $T_1$. Responsive to this action, brakes 60, 62, 64, and 66 all act on their respective sheaves. Running rigging R between the intermediate point on the tongue 25 and the respective trailing corners of the towing trailer $T_1$ and the leading corners of the towed trailer $T_2$ become relatively locked. Two specific restraints act on the tandem towed trailers to prevent relative jackknifing action.

First, running rigging is locked between the respective leading corners at sheave 74 to fixed point 71 and at sheave 76 to fixed point 73.

Second, the cable mechanism is locked between the sheave 74 at the leading edge of the towed trailer $T_2$ and the sheave 70 at the intermediate point of the trailer tongue 25. On the opposite side locking likewise occurs between sheave 76 on the leading corner of towed trailer $T_2$ and sheave 72 on tongue 25. By forming a unitary structure with opposed tension on both sides of the running rigging R, relative movement between the towing trailer $T_1$ and the towed trailer $T_2$ is prevented inhibiting the jackknifing action.

I prefer the four brake cylinder embodiment herein disclosed. It should be understood, however, that the disclosed apparatus will function with only two brakes required. Specifically, one brake such as brake 64 acting on sheave 74 from trailer $T_2$ . and one brake such as brake 60 acting on its respective sheave will effectively lock tongue 25 between $T_1$ and $T_2$.

The reader will appreciate that although the disclosed running rigging complicates the leading tongue of the towed trailer $T_2$, it effects minimal inconvenience in attachment to the towing trailer $T_1$. Specifically, and in addition to attaching the tongue at pivot 20, attachment of the fixed ends of the running rigging R at attachment points 71, 73 is all that is required. Given the antijackknifing feature of this invention, this additional manipulation is minimal.

It will be further understood that the disclosed invention is applicable to trucks towing more than two trailers.

I preferred the hydraulic brake system here used for its simplicity. Other brake systems may be obviously substituted. Such systems can include air brakes, electrically actuated brakes and virtually all other brakes capable of stopping the illustrated running rigging.

What is claimed is:

1. In combination a towing tractor;
a first towing trailer pivotally attached to said towing tractor for being serially towed first in order behind said towing tractor;
a second towed trailer, said second towed trailer having a fixed rear wheel set and a forward pivoting steering wheel set, said second towed trailer for being serially towed second in order behind said towing tractor from said first towing trailer;
a towing point affixed to a rear of said towing trailer;
a tongue attached to said second towed trailer, said tongue attached to said steering wheel set of said towed trailer for permitting said towed trailer to be towed and for effecting steering of said steering wheel set about said pivot point of said towed trailer, said tongue fastened at the forward portion thereof to said towing point on said towing trailer for enabling said towed trailer to follow and steer in the track of said towing trailer, the improvement of an antijackknifing device acting between said towed trailer and said towing trailer comprising:
running rigging for reeving between a first fixed point and a second fixed point, said rigging reeved through a reeving path;
first and second spaced apart points on said towing trailer for fixedly attaching respective first and second ends of running rigging to said towed trailer, said first point being spaced apart from said towing point for attachment of said tongue and said second point being spaced apart form said first point and said towing point;
a reeving path including first, second and third reeving points;
said first reeving point affixed to a leading edge of said towed trailer at a point spaced from the tongue of said towed trailer;
said second reeving point attached to the tongue of said towed trailer, said second reeving point intermediately located on said tongue between the towing point of said tongue to said towed trailer and the pivot point of said wheel set on said towed trailer;
said third reeving point attached to the leading edge of said towed trailer separate from said first reeving point;
said running rigging being disposed under tension along said reeving path;
first brake means acting on at least one of said reeving points on the leading edge of said towed trailer for applying a braking force to said running rigging;
second brake means acting on said tongue for applying a braking force on said running rigging to said tongue on said towed trailer;
brake actuating means mounted between said said towing and towed trailers for applying said brakes responsive to compression forces exerted on said tongue; and,
means for locking said brakes on said running rigging responsive to said brake actuating means whereby said running rigging rigidly acts under tension in combination with said tongue during application of said brake to inhibit relative jackknifing action between said towed and towing trailers.

2. The invention of claim 1 and wherein said brake means acts at said reeving points.

3. The invention of claim 1 and including third brake means acting on third reeving point on said towed trailer.

4. The invention of claim 1 and including means for tensioning said running rigging attached to said towed trailer.

5. The invention of claim 4 and including said means for tensioning said running rigging attached to the tongue of said towed trailer.

6. In the combination of a towing tractor;
a first towing trailer pivotally attached to said towing tractor for being serially towed first in order behind said towing tractor;

a second towed trailer, said second towed trailer having a fixed rear wheel set and a forward pivoting steering wheel set;

a towing point affixed to a rear of said towing trailer;

a tongue fastened to said steering wheel set of said towed trailer for towing said towed trailer and steering said steering wheel set of said towed trailer about said pivot point, said tongue fastened at the forward portion thereof to said towing point to follow and steer in the track of said towing trailer;

running rigging for reeving between a first fixed point and a second fixed point on said towing trailer, said running rigging affixed to said towed trailer to define a reeving path;

said towing trailer further including first and second spaced apart points on said towing trailer for fixedly attaching respective first and second ends of running rigging to said towed trailer said first and second spaced apart points being spaced apart from said towing points and spaced apart from one another; the improvement to said towed trailer comprising:

said reeving path including a first reeving point affixed to a leading edge of said towed trailer at a point spaced from the tongue of said towed trailer;

a second reeving point attached to the tongue of said towed trailer, said second reeving point intermediately located on said tongue between the towing point of said tongue to said towing trailer and the pivot point of said wheel set on said towed trailer;

a third reeving point attached to the leading edge of said towed trailer separate from said first reeving point;

said running reeving being disposed under tension along said reeving path;

first brake means acting on at least one of said reeving points on the leading edge of said towed trailer for applying a braking force to said running rigging;

second brake means acting on said tongue of said towed trailer for applying a brake force on said running rigging at said second reeving point;

brake actuating means for applying said brakes responsive to compression forces exerted on said tongue; and, means for locking said brakes on said running rigging responsive to said brake actuating means whereby said running rigging rigidly acts under tension in combination with said tongue during application of said brake to inhibit relative jackknifing action between said towed and towing trailers.

7. The invention of claim 6 and including third brake means acting on said third reeving point on the leading edge of said towed trailer.

8. The invention of claim 6 and wherein said running rigging comprises a cable.

9. The invention of claim 6 and wherein each said brake means includes a brake shoe acting on a cable passing over a sheave at said rigging points.

* * * * *